Jan. 21, 1964     L. F. GLAUDE     3,118,261
TOOL ADAPTER APPARATUS FOR A DRILL PRESS
Filed July 24, 1961     2 Sheets-Sheet 1
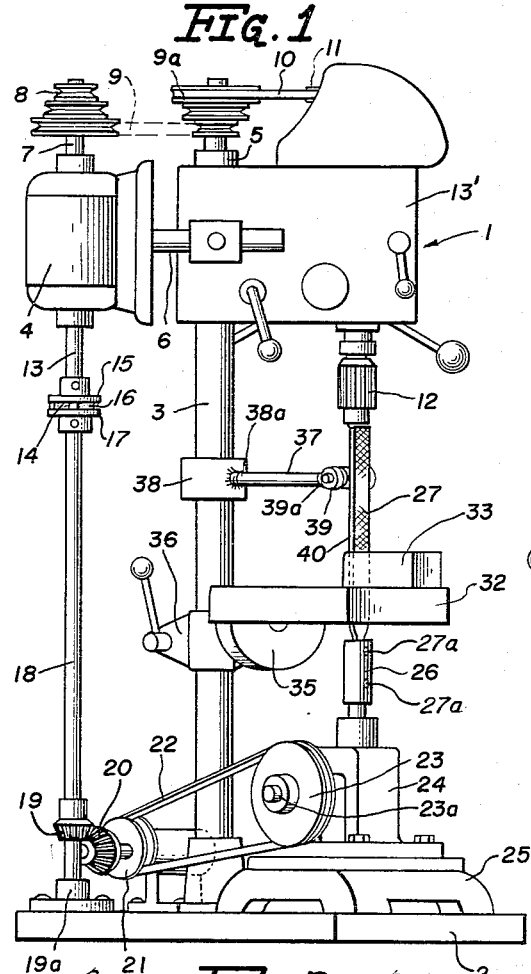
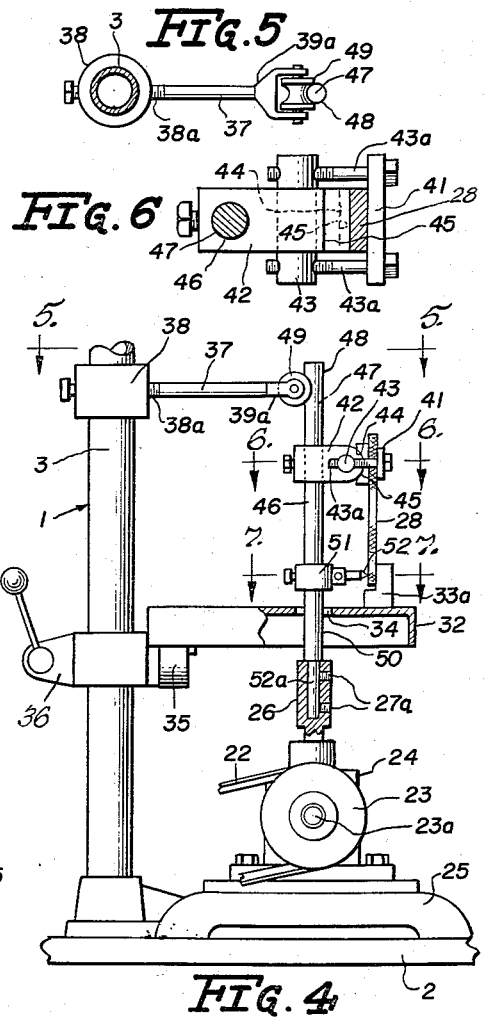
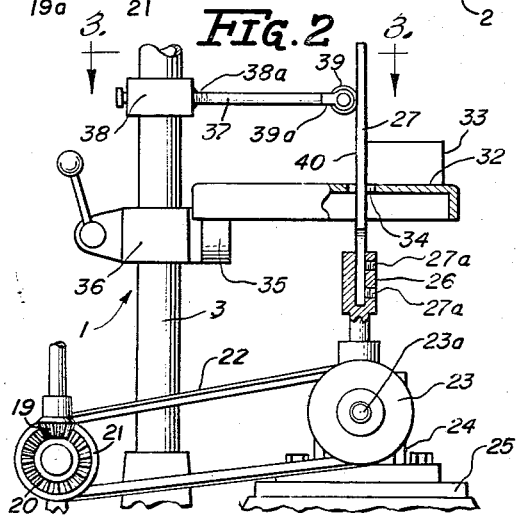
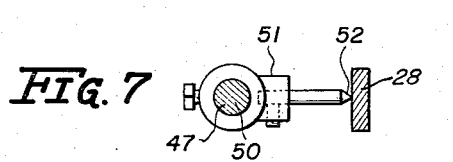
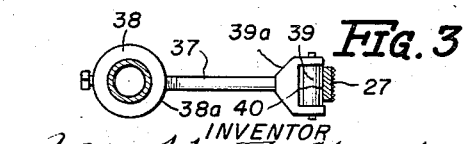
INVENTOR
Leopold F. Glaude
BY Richard J. Myers
and John J. Kowalik
ATTORNEYS Jan. 21, 1964  L. F. GLAUDE  3,118,261
TOOL ADAPTER APPARATUS FOR A DRILL PRESS
Filed July 24, 1961  2 Sheets-Sheet 2
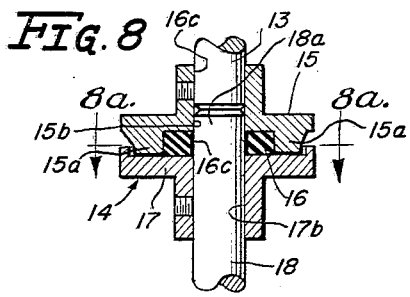
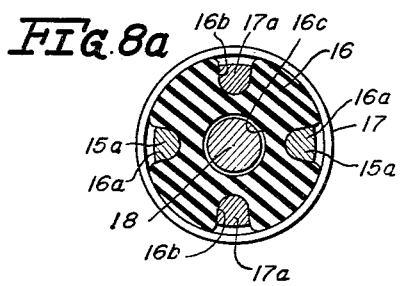
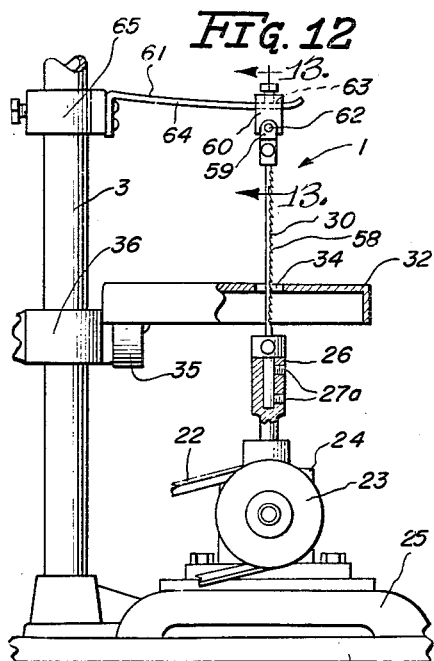
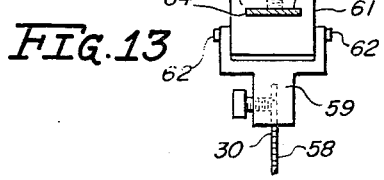
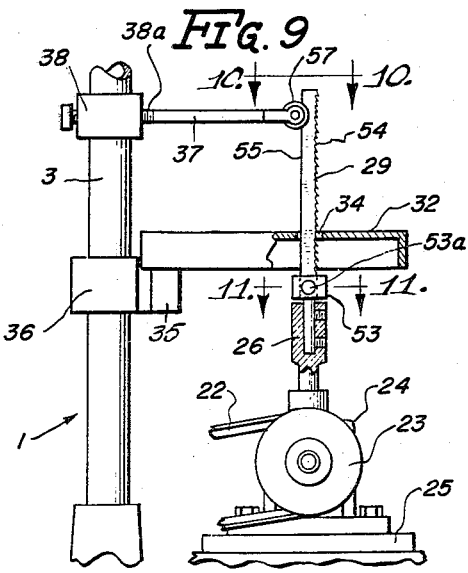
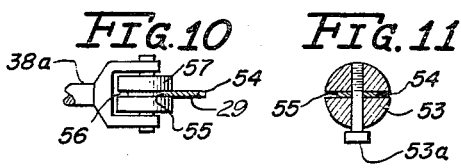
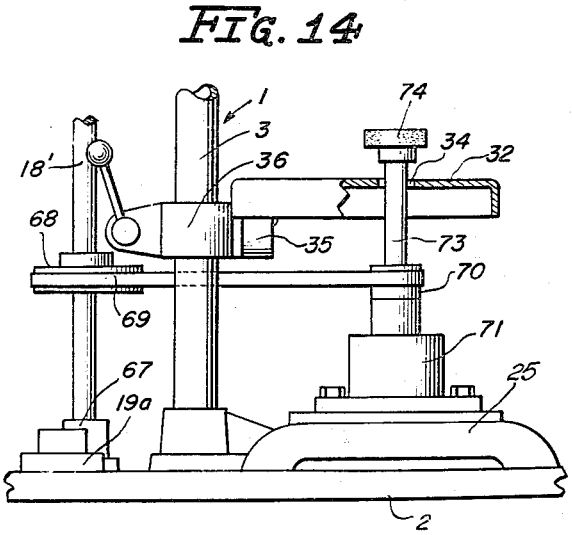
INVENTOR
Leopold F. Glaude
BY Richard J. Myers and
John J. Kowalik
ATTORNEYS

United States Patent Office 3,118,261
Patented Jan. 21, 1964

3,118,261
TOOL ADAPTER APPARATUS FOR A DRILL PRESS
Leopold F. Glaude, 2314 N. Kilpatrick, Chicago, Ill.
Filed July 24, 1961, Ser. No. 126,352
2 Claims. (Cl. 51—241)

This invention relates to tool adapter apparatus and in particular tool adapter apparatus for a drill press.

A power operated drill press is a very common type of equipment found in most work shops and it is the purpose of this invention to provide adapter means to expand its use to other operations such as punch filing and honing, other filing operations, hack saw and jig saw work, grinding, and the like.

It is therefore a general object of this invention to provide adapter apparatus for a drill press to perform other tool working operations.

Another object of this invention is to provide a drill press that is readily convertible to perform reciprocating tool movements to effect filing, honing and sawing operations and the like.

It is a still another object of this invention to provide apparatus for a drill press to perform rotating tool movement for grinding operations.

A further object is to provide novel flexible coupling means on the drill press for more stabilized and positive power transmission to perform the aforementioned tool working operations.

These and other objects will become apparent from reference to the accompanying drawings and following description which are not to be construed as a limitation to the scope and breadth of the appended claims wherein:

FIGURE 1 is a perspective view of a drill press illustrating the novel tool adapter apparatus employing a flat file which is reciprocally operated;

FIGURE 2 is a side elevational sectional view of the adapter apparatus of FIGURE 1 employing the flat file;

FIGURE 3 is a sectional view taken along line 3—3 of FIGURE 2;

FIGURE 4 is a sectional view in side elevation of the tool apparatus employing a file to perform reciprocating punch filing and honing operations;

FIGURE 5 is a sectional view taken along line 5—5 of FIGURE 4;

FIGURE 6 is a sectional view taken along line 6—6 of FIGURE 4;

FIGURE 7 is a sectional view taken along line 7—7 of FIGURE 4; and

FIGURE 8 is a sectional view of the flexible coupling means employed in my adapter apparatus;

FIGURE 8a is a sectional view taken along lines 8a—8a of FIGURE 8;

FIGURE 9 is a sectional view of the drill press in side elevation illustrating the use of a reciprocating hack saw;

FIGURES 10 and 11 are sectional views of the hack saw arrangement taken along lines 10—10 and 11—11 respectively of FIGURE 9, FIGURE 12 is a sectional view in side elevation of the drill press employing a reciprocating jig saw apparatus;

FIGURE 13 is a sectional view taken along line 13—13 of FIGURE 12; and

FIGURE 14 is a sectional view in side elevation of the drill press performing rotary grinding operations.

With reference now to the drawings and in particular to FIGURE 1 there is shown a conventional drill press apparatus 1 having a base 2 and a standard 3 supported on and extending upward from the base 2 and supporting a motor 4 at its upper end 5 by means of arm 6, the motor 4 having an upper output shaft 7 and pulley 8 and a belt 9 (shown in dotted) for connection to pulley arrangement 9a atop standard 3 for normal drill press operation by way of belt 10 and pulley structure 11 for rotationally driving drill press tool bit 12 which is not in operation while performing other tool operations using the novel tool adapter apparatus to be hereafter explained.

The arm 6, the pulley structures 9a and 11 and the drill press tool bit 12 form an integral portion of the drill press housing structure or support 13 which is rotatively supported at the upper end 5 of the vertically upright standard 3 to permit the motor 4 to be placed in various positions about the vertical axis of the standard 3 and as shown in FIGURES 1 through 13 is to the left side of the standard 3 for reciprocating tool operations whereas for rotary grinding operations, as seen in FIGURE 14, is swung approximately 180° to the right side of the standard 3, as will be later explained.

The motor 4 has another lower drive shaft 13' depending downward therefrom having a coupler mechanism 14. The flexible coupler mechanism 14 comprises an upper rigid member or disc 15, a middle flexible element or disc of elastomeric material, for instance of rubber, and a lower rigid member or disc 17. The upper disc 15 is locked to the upper shaft 13 and the lower disc 17 is locked or keyed to a lower shaft and the flexible element 16 is sandwiched or locked between both discs 15 and 17 to provide a flexible coupling between shaft 13 and shaft 18, the lugs 15a of disc 15 registering in grooves 16a of disc 16 and lugs 17a registering in grooves 16b of disc 16. The lower shaft extends upward through bore 17b of disc 17 and upward through bore 16c of disc 16, and the upper end portion 18a of extension shaft 18 is received somewhat or slightly in the bore 15b of shaft 15 to provide a stabilizing effect or action to the flexible coupling between shafts 15 and 17 and to prevent their wobbling relative to one another or being horizontally displaced from one another.

The shaft 18 exiting from the coupler 14 is journaled at its lower end in a journal means or bearing 19a mounted on the base. Extension shaft 18 carries bevel gear 19 at its lower end that meshes with bevel gear unit 20 mounted on base 2 and carrying pulley 21 and belt 22 drivingly connected to pulley 23 mounted shaft 23a of gear box 24 mounted on pedestal 25 setting on base 2. The gear box 24 provides for and imparts reciprocating or upward and downward movement of tool support assembly 26. The construction and function of the gear box 24 is of a conventional nature and operates in fashion disclosed in my U.S. Patent No. 2,333,169. The structures 19, 20, 22, 23 and 24 constitute a driving train.

The tool support assembly 26 carries and supports, in an upright position, a flat file 27 by set screws 27a as shown in FIGURE 1 or punch or honing file 28 of FIGURE 3 or hacksaw 29 of FIGURE 9 or jig saw 30 of FIGURE 12, all of such tools 27, 28, 29 and 30 having reciprocation relative to an associated work piece to either file, hone or saw or cut the work piece as the case may be, the work piece being supported on stationary plate or work support 32 in the manner of work piece 33, illustrated in FIGURE 1, or work 33a in FIGURE 4, the tool 27, 28, 29a, 30 moving up and down through aperture 34 of the work support 32 which is attached arcuate gauge element or quadrant 35 for tilting the plate 32 relative to the quadrant 35 and the base 2 and consequently the work 33 relative to the tool 27, 28, 29 or 30, the quadrant 35 being secured to the upright column 3 for this purpose by locking element 36.

The file 27 is held against movement from the vertical or in an upright position to prevent horizontal displacement or movement of the work piece 33, by horizontally extending stabilizer or arm 37 having at its collar end 38a couple 38 about column 3 and roller bearing element 39 at its other yoked end 39a engaging the face 40 of the file 27, whereas if the file were of short vertical extent or a short file, support 37 is not required for light work loads.

The honing file 29 of FIGURE 4 is carried by clamp jaw design 41 pivotally to brace 42 by pivot pin 43 threadingly receiving bolts 43a on clamp jaw design 41 having an inner concave face 44 complementarily engaging outer convex face 45 of brace 42 locked to median portion 46 of standard 47 having at its upper end 48 a roller bearing design 49 of support 37 engageable therewith, the lower portion 50 of column 47 having guide structure 51 fastened thereto having its tapered end 52 supporting the lower end of file 28 against horizontal displacement and the distal end 52a of the standard 46 being locked in chuck 26 by set screws 27a.

The hack saw 29 is supported in chuck 26 having a collar 53 and pin 53a therein passing through the apertured lower of end of blade 29 which has upper outward face 54 serrated or toothed for hack saw operation on an associated work and has in inward facing upward portion 55 riding in annular groove formation 56 of roller bearing structure 57 of the stabilizer or arm 37 coupled to standard 3 as seen in FIGURE 9.

In FIGURE 12 the jig saw 30 is locked at its lower end in chuck in a manner similar to back saw 29 and has a forward facing work cutting tooth edge 58 and has its upper end locked in pendulating yoke assembly 59 being pivotally suspending by block 60 of flexible hangar structure 61 at pivots 62, the block 60 receiving and locking in its slot 63 flexible band member 64 of hanger 61 and the band 64 being bolted to bracket or collar 65 hold on standard 3. In operation the jig saw 30 moves up and down flexing the band 64 which guides the blade 30 in its cutting action on an associated work piece.

In the grinding operation shown in FIGURE 14 the carriage is rotated 180° on the standard 3 with shaft 18 disconnected and a similar shaft 18' is journalled in bearing support 67 on opposite of standard 3 mounted on base 2 and carries a pulley 68 at its lower end to drive belt 69 which drives pulley chuck 70 mounted on support 71 on base 2, the chuck 70 being rotated thereby and rotating upright shaft 73 carrying grinding element 74 which rotates and grinds on the surface of an associated work.

Thus it is seen that the novel tool adapter apparatus comprises converting a standard drill press by employing a drive system of pulleys and gears to perform alternatively reciprocating movement or rotational movement to a tool for performing filing, cutting, sawing, or grinding on an associated work piece, the coupler mechanism 14 providing for smooth transmission of drive from the motor to the reciprocating or rotating tool apparatus and in particular to the reciprocating action of the tool apparatus which results in a motion conversion from rotational to reciprocal drive that normally imparts undue strains on the motor output shaft and develops an erratic pattern but because of my coupling mechanism maintains the motor output shaft and thus the motor free from harmful vibrational forces normally present because of the conversion. It will be realized that the rubber-like material 16 between lugs 15a and 17a is not confined radially and may expand freely beyond the discs 15 and 17 under certain conditions.

What is claimed is:

1. In a drill press having a base with an upstanding standard, a support mounted on the standard, means including a chuck mounted on the support generally parallel to the standard, a motor mounted on the support and having an upper output shaft and a lower output shaft, a drive connection between the upper output shaft and said means, extension shaft depending from said lower output shaft, means coupling said lower output shaft with said extension shaft, journal means on the base rotatably mounting the lower end of the extension shaft, a driving train comprising a portion connected to the lower end of the extension shaft, a work support adjustably carried by the standard above the base, and said driving train having a portion beneath said work support, and including an upwardly extending tool support assembly, a tool mounted on said assembly and extending through said work support.

2. The invention according to claim 1 and said coupling means comprising a pair of axially spaced members connected respectively to said lower output shaft and to said extension shaft, each having a plurality of lugs axially directed toward and overlapping the lugs of the other member and being spaced circumferentially of one another, a pad of elastomer material interposed between said members and having a plurality of notches axially directed and spaced circumferentially of one another complementary receiving the lugs, in interdigitating relation, said members and pad having registering openings defining a common aperture admitting one of the shafts therethrough.

References Cited in the file of this patent

UNITED STATES PATENTS

| | | |
|---|---|---|
| 1,030,598 | Miller | June 25, 1912 |
| 1,323,850 | Fisher | Dec. 2, 1919 |
| 2,074,976 | Beardsley | Mar. 23, 1937 |
| 2,244,813 | Tommerup | June 10, 1941 |
| 2,587,819 | Camerino | Mar. 4, 1952 |
| 2,616,273 | Pringle | Nov. 4, 1952 |
| 2,654,405 | Hulfish | Oct. 6, 1953 |
| 2,670,018 | Coates | Feb. 23, 1954 |
| 2,710,632 | Richter | June 14, 1955 |
| 2,835,289 | Rockwell | May 20, 1958 |